US008094552B1

(12) United States Patent
Sachidanandam

(10) Patent No.: US 8,094,552 B1
(45) Date of Patent: Jan. 10, 2012

(54) ADAPTIVE BUFFER FOR FRAME BASED STORAGE COMMUNICATIONS PROTOCOLS

(75) Inventor: Kannan Sachidanandam, Shrewsbury, MA (US)

(73) Assignee: Seagate Technology LLC, Cupertino, CA (US)

( * ) Notice: Subject to any disclaimer, the term of this patent is extended or adjusted under 35 U.S.C. 154(b) by 1000 days.

(21) Appl. No.: 11/433,122

(22) Filed: May 12, 2006

Related U.S. Application Data

(60) Provisional application No. 60/733,070, filed on Nov. 3, 2005.

(51) Int. Cl.
*H04L 12/28* (2006.01)
*G01R 31/08* (2006.01)
*H04J 3/00* (2006.01)

(52) U.S. Cl. .................. 370/230; 370/412; 370/476

(58) Field of Classification Search .......... 370/229–235, 370/412, 470–476
See application file for complete search history.

(56) References Cited

U.S. PATENT DOCUMENTS

| | | | | |
|---|---|---|---|---|
| 6,031,842 | A * | 2/2000 | Trevitt et al. ................... | 370/412 |
| 6,381,659 | B2 * | 4/2002 | Proch et al. ...................... | 710/57 |
| 6,452,753 | B1 | 9/2002 | Hiller et al. ................ | 360/254.7 |
| 6,480,361 | B1 | 11/2002 | Patterson ................... | 360/254.3 |
| 6,697,366 | B1 * | 2/2004 | Kim ............................. | 370/392 |
| 7,366,802 | B2 * | 4/2008 | Seto ............................... | 710/52 |
| 2002/0124132 | A1 * | 9/2002 | Haines et al. ................. | 711/112 |
| 2004/0004964 | A1 * | 1/2004 | Lakshmanamurthy et al. ............................ | 370/394 |

OTHER PUBLICATIONS

U.S. Appl. No. 11/324,350, filed Jan. 3, 2006, entitled *Disk Drive that Saves Buffered Host Commands to a Non-Volatile Memory Upon Power Failure and Methods Thereof*.
U.S. Appl. No. 11/132,534, filed May 19, 2005, entitled *Disk Drive that Parks a Transducer Therein Responsive to a Host Prediction of Imminent Transducer to Disk Contact*.
Emulex Technology Brief for LightPulse™ Fibre Channel, www.emulex com, Dec. 2002.
"Computerworld Storage Networking World," SNIA Conference, Oct. 24-27, 2005, JW Marriott Grande Lakes Resort, Orlando, FL.
Smith, Michael, InfoStor: Benefits of a large HBA data buffer, Jul. 2001, from www.infostor.com.
Definition of "storage area network" on www.whatis.com accessed Feb. 7, 2006.
Definition of "bufffer credits" on www.whatis,com, accessed Jan. 17, 2006.

* cited by examiner

*Primary Examiner* — Chirag Shah
*Assistant Examiner* — Srinivasa Reddivalam
(74) *Attorney, Agent, or Firm* — HolzerIPLaw, PC

(57) ABSTRACT

Methods of managing a receive buffer in a receiving communications terminal are disclosed, the receive buffer including a data memory organized into a plurality of individually addressable data words and into a plurality of segments, each of which is larger than one addressable data word but smaller than a maximum frame size. The methods include receiving a frame of data from an originating communications terminal, storing the received frame of data in the receive buffer beginning at a selected segment of a group of reserved segments, and releasing a number of the reserved segments equal to the number of segments in a maximum frame size less an actual number of segments occupied by the received frame. A frame buffer available notification is sent to the originating communications terminal in response to a determination that a number of unreserved segments available in the receive buffer after storing the received frame is larger than the maximum frame size, and a number of segments in the receive buffer equal to the maximum frame size are reserved.

18 Claims, 4 Drawing Sheets

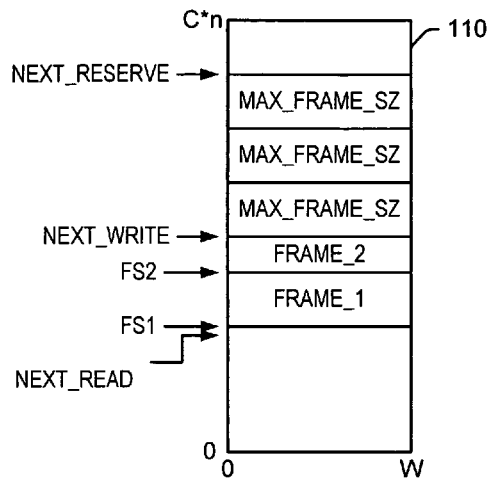
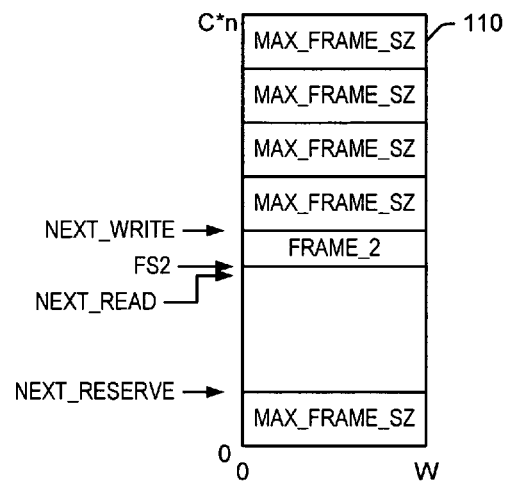
FIGURE 5A  FIGURE 5B
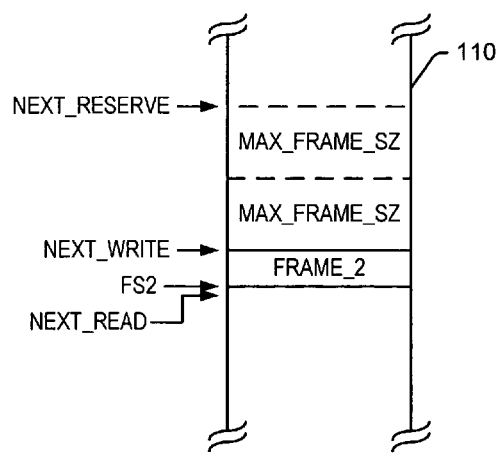
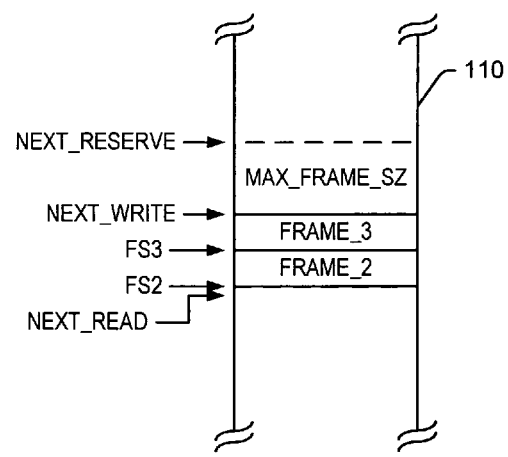
FIGURE 6A  FIGURE 6B

ADAPTIVE BUFFER FOR FRAME BASED STORAGE COMMUNICATIONS PROTOCOLS

RELATED APPLICATION

This application claims the benefit of and priority to U.S. Provisional Patent Application No. 60/733,070 titled "Adaptive Buffer For Connection and Frame Based Storage Protocol", filed Nov. 3, 2005, the disclosure of which is hereby incorporated herein by reference as if set forth in its entirety.

FIELD OF THE INVENTION

The present invention relates to data communications systems and methods. In particular, the present invention relates to systems and methods for frame based data communications systems and methods for data storage systems.

BACKGROUND

High speed data communication protocols are used to transfer large amounts of data at high speeds over a communications channel from a sending, or originating, terminal (sender) to a receiving terminal (receiver). The communications channel may include, for example, a switched or dedicated channel in a data communications network. Data communications networks may be classified by geographic scope, such as a local area network (LAN), which may be as small as a single room or as large as several buildings, or a wide area network (WAN), which may span hundreds of miles or more.

It may also be convenient to classify networks on a functional/logical basis. For example, a storage area network (SAN) is a network that provides access to high-speed storage devices. In many cases, a substantial portion of network traffic in an enterprise involves storing and/or retrieving large amounts of data from local or remote databases. A storage area network interconnects different kinds of data storage devices with associated data servers. A storage area network is usually located near the servers/users it serves, but may also include remote locations for physically secure archival storage, using wide area network protocols such as Asynchronous Transfer Mode (ATM) or Synchronous Optical Network (SONET).

High speed data communication protocols define an orderly process for setting up, using, and taking down (inactivating) a communications channel. Such protocols may be used to send data from one communications terminal to another over a wired and/or wireless communications channel. For example, high-speed data communications protocols may be used to send data from one communications terminal to another over a satellite and/or microwave communications link. High speed data communications protocols may be used to send data to/from a peripheral device, such as a mass storage device (e.g. a hard disk drive), a scanner, a camera, a printer, or the like, from/to a central processing unit of a computer. In that case, one of the communications terminals may include a host adapter (or host bus adapter), which is attached to both the central processing unit and the communications channel, and which mediates the use of the communications channel.

The transmission of data at high data rates over relatively long distances places additional demands on communications systems and protocols, as the distance between the sending and receiving terminals must be taken into account when determining channel capacity and/or utilization. For example, the latency between a sender and a receiver for communication over an optical fiber is about 5 μs per kilometer. That is, for each kilometer between sender and receiver, there is a 5 μs delay between sending a signal and receiving the signal. Thus, a 2 Gbit/s, 10 km long unidirectional link may hold up to 100 kbits bits in transit at any given moment, which means that a 10 kbit long message only occupies 1/10th of the available channel capacity. In certain low data rate communications protocols, after sending a message, a sending terminal may not send another message until it has received an acknowledgement (ACK) signal from the receiving terminal. In order to fully utilize a high speed channel, it may be desirable for a sending terminal to be able to send additional messages before an acknowledgement of the first message is received. This functionality may be provided/defined in the communications protocol.

Two data communications protocols that are commonly used to provide high speed data communications between mass storage devices and central processing units are Serial Attached SCSI (Small Computer Systems Interface) and Fibre Channel Arbitrated Loop.

In a high speed data communications protocol such as Serial Attached SCSI or Fibre Channel Arbitrated Loop, messages are usually divided into frames, which may have a frame size up to a maximum frame size (usually 1 or 2 kilobytes). Each side of the communications channel may maintain a receive buffer in which received frames are stored until they can be processed.

In order to permit multiple unacknowledged frames to be sent without causing buffer overruns, communications protocols typically use a system of buffer credits, also called buffer-to-buffer credits (BBCs). In buffer-credit flow control, the source (sending) and destination (receiving) communications terminals signal the availability of buffers by sending Receiver Ready primitives (RRDYs), each one of which signals the availability of a free frame buffer. A counter at each end keeps track of the number of RRDYs sent or received. The source port increments the number of transmit credits every time a RRDY is received and decrements the count each time a frame is sent (credit is used). The destination port increments a counter for every RRDY sent and decrements it for every frame received. The source port should not send frames unless it has positive credit. This may prevent loss of frames that may result from a buffer overrun. Some standards, such as Fibre Channel, allow some frames to be transmitted before RRDYs are received, by allowing some number of credits (non-zero initial credits) to be assumed to exist as soon as a connection is established through previous negotiations between the two ports. Non-zero initial buffer credits may improve utilization and throughput in data communications in a storage area network in which there are long spans between terminals.

As the length and/or throughput of a communications channel increases, the size of the receive buffer and the number of available buffer credits may be increased accordingly. However, such increases add to the complexity of the sending and receiving terminals. Not only is more memory space required for a larger buffer, but the number of bits required to address a particular frame may become larger, requiring more complex and/or time consuming address calculations in order to store a frame and/or access a stored frame.

SUMMARY

Some embodiments of the invention provide methods of managing a receive buffer in a receiving communications terminal. The receive buffer may include a data memory organized into a plurality of individually addressable data words and into a plurality of segments, each of which is larger than one addressable data word but smaller than a maximum frame size. The methods may include receiving a frame of data from an originating communications terminal and storing the received frame of data in the receive buffer beginning at a selected segment of a group of reserved segments. A number of the reserved segments equal to the number of segments in a maximum frame size less an actual number of segments occupied by the received frame are released. In response to a determination that a number of segments available in the receive buffer after storing the received frame is larger than the maximum frame size, a notification is sent to the originating communications terminal and a number of segments in the receive buffer equal to the maximum frame size are reserved.

The methods may further include determining a number of unreserved segments that are available for storing received frames after releasing the number of reserved segments.

The received frame may be received over a Serial Attached SCSI connection and/or a Fibre Channel Arbitrated Loop connection, and the frame buffer available notification may include an RRDY primitive.

The address of the selected segment of the group of reserved segments may be stored in a read address pointer, and the methods may further include, after storing the received frame, updating the read address pointer to the address of a next available segment after the end of the stored received frame.

Updating the read address pointer may include resetting the read address pointer to zero after the read address pointer has reached a maximum read address in the data memory.

The methods may further include encoding the address of the selected segment as an encoded frame start address, and storing the frame start address in a frame index table.

The methods may further include storing a frame length and a frame index along with the frame start address in the frame index table, storing frame specific identification data along with the frame start address in the frame index table, and/or storing connection specific identification data along with the frame start address in the frame index table.

Encoding the address of the selected segment may include encoding an m-bit address according to the formula:

$$m = ceil\left[\log_2\left(\frac{L}{N}\right)\right]$$

where L equals the number of addressable words in a maximum sized frame, and N equals the number of addressable words in a segment.

The methods may further include encoding a read index pointer to a next read location within the frame index, and a write index pointer to a next location to which a frame index may be written, and updating the write index pointer after storing the frame index pointer in the frame index table.

The methods may further include processing the received frame, releasing the segments occupied by the received frame, and updating the read index pointer after processing the received frame.

The number of entries in the index table may be calculated according to the formula $(C-1)(L/N)+1$, where C equals the number of addressable words in the data memory divided by the number of addressable words in a maximum sized frame, L equals the number of addressable words in a maximum sized frame, and N equals the number of addressable words in a segment.

The methods may further include processing the received frame, and releasing the segments occupied by the received frame.

The number of addressable data words in a maximum sized frame may be an integral multiple of a number of addressable data words in a segment.

A communications terminal according to some embodiments of the invention includes a channel adapter configured to receive a frame of data from an originating communications terminal over a communications channel. The channel adapter may include a receive buffer including a data memory organized into a plurality of individually addressable data words and into a plurality of segments, each of which may be larger than one addressable data word but smaller than a maximum frame size. The channel adapter may further include a logic circuit configured to store the received frame of data in the receive buffer beginning at a selected segment of a group of reserved segments, and configured to release a number of the reserved segments equal to the number of segments in a maximum frame size less an actual number of segments occupied by the received frame. The logic circuit may further be configured to send a notification to the originating communications terminal in response to a determination that a number of segments available after storing the received frame may be larger than the maximum frame size, and to reserve a number of segments in the data memory equal to the maximum frame size.

The logic circuit may be further configured to encode the address of the selected segment as an encoded frame start address, and to store the frame start address in a frame index table.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIGS. 5A and 5B are schematic illustrations of a receive buffer illustrating the reservation and use of buffers.

FIGS. 6A and 6B are schematic illustrations of a receive buffer further illustrating the reservation and use of buffers.

DETAILED DESCRIPTION OF EMBODIMENTS OF THE INVENTION

Figure 1:
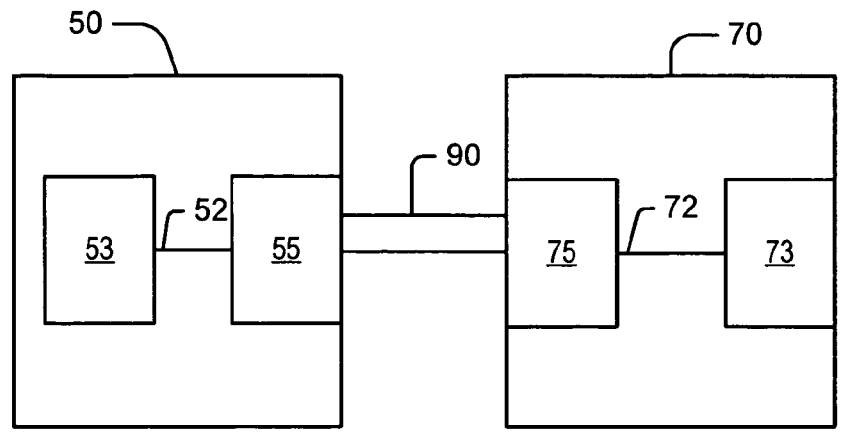
FIG. 1 is a block diagram illustrating a high speed communications channel between communications terminals according to some embodiments of the invention.

Embodiments of the present invention provide methods for managing a receive buffer in a communications terminal, wherein the receive buffer is organized into a plurality of individually addressable data words and into a plurality of segments, each of which is larger than one addressable data word but smaller than a maximum frame size. These embodiments may provide for faster and/or more efficient utilization of the memory space of a receive buffer. Further embodiments of the invention may reduce the logic required and/or increase the speed of calculating available buffer credits in a high-speed data communication terminal.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

FIG. 1 is a block diagram illustrating a high speed communications channel 90 between a first communications terminal 50 and a second communications terminal 70. The first communications terminal 50 may include, for example, a mass storage device 53 such as a hard disk drive. A channel adapter 55 is coupled to the mass storage device 51 via an internal bus 52. The second communications terminal may include, for example, a central processing unit (CPU) 73 and a channel adapter 75 coupled to the CPU 73 by an internal bus 72. It will be appreciated that either communications terminal 50, 70 may include a programmable controller/microprocessor and/or static logic circuits configured to control the operation of an associated channel adapter 55, 75. In addition, the channel adapters 55, 75 may include dedicated logic circuits and/or controllers/microprocessors. Moreover, either communications terminal 50, 70 may include a storage device.

The first and second communications terminals 50, 70 are connected by a high speed data communications channel 90, which include one or more wired and/or wireless communications links. In particular embodiments, the communications channel 90 may include an optical communications link. Communications over the communications channel 90 are managed by the channel adapters 55, 75. The channel adapters 55, 75, may be configured to implement a standardized communication protocol, such as Serial Attached SCSI or Fibre Channel Arbitrated Loop. Alternatively or additionally, the channel adapters 55, 75 may be configured to implement a non-standard communications protocol. One of the channel adapters 55, 75 may be configured as a host bus adapter, which may supervise the operation of the communications channel 90.

Figure 2:
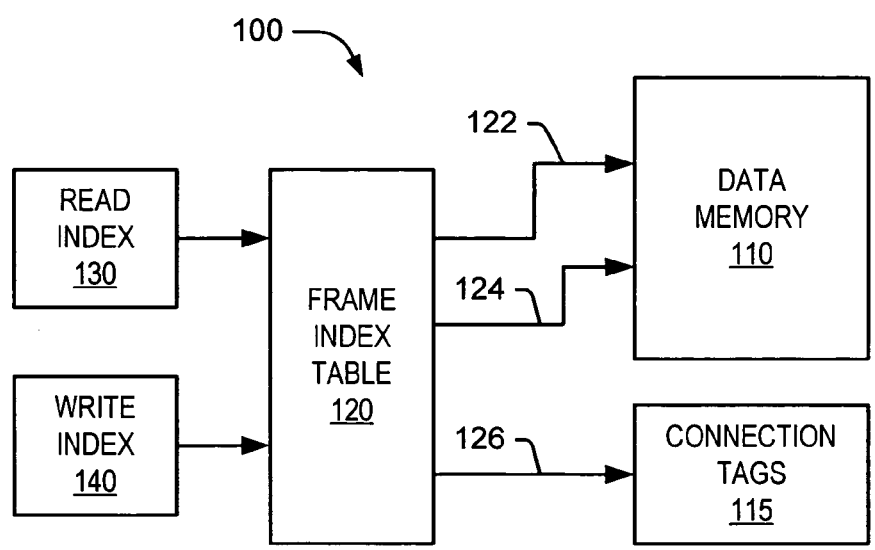
FIG. 2 is a block diagram illustrating the organization of a receive buffer 100 in a data communications terminal according to some embodiments of the invention.

FIG. 2 is a block diagram illustrating the organization of a receive buffer 100, which may be found in a data communications terminal. In particular, the receive buffer may be implemented in one or more of the channel adapters 55, 75 shown in FIG. 1. The receive buffer 100 includes a data memory 110, which may be, for example, a two-ported random access memory (RAM) capable of simultaneously reading and writing data. Received frames are stored in the data memory 110 until they can be processed by the data communications terminal. A plurality of frame indices stored in a frame index table 120 provide pointers to the locations of frames in the data memory 110. Also associated with the frame indices in the frame index table 120 are a read pointer 122 to a read address in the data memory 110 (i.e. the next location from which a frame is to be read) and a write pointer 124 to a write address in the data memory 110 (i.e. the next location to which a frame may be written).

A read index 130 points to the next read location within the frame indices, and a write index 140 points to the next location to which a frame index may be written. The frame index table 120, the read index 130 and the write index 140 may be stored in the same physical location, e.g. within the same memory device, and/or within separate physical memory devices. The frame indices and/or read/write indices may be stored inside and/or outside the channel adapter, for example in a memory addressable by a microprocessor outside the channel adapter.

The frame index table 120 may be organized as shown in Table 1. As shown therein, each frame index includes a Sequence Number, a Frame Start Address (i.e. a pointer to the location within the data memory 110 that the frame begins), and a Frame Size. Optionally, each frame index may include Frame Specific Identification Data and/or Connection Specific Identification Data.

TABLE 1

Frame Indices

| Sequence No. | Frame Start Address (S bits) | Frame Size (M bits) | Frame Specific Identification Data (P bits) | Connection Specific Identification Data (C bits) |
|---|---|---|---|---|
| 0 | | | | |
| 1 | | | | |
| . | | | | |
| . | | | | |
| . | | | | |
| q-1 | | | | |
| q | | | | |

The Frame Specific Identification Data may include details relating to the associated data frame, such as CRC check status, framing primitives (i.e. basic data fields that define the characteristics of the frame), etc. The Connection Specific Identification Data (CSID) may include data relating to the connection over which the frame was received, such as the source terminal, the link rate, connection tags, etc. In some embodiments, the Frame Specific Identification Data and/or the Connection Specific Identification Data may be stored in the data memory 110 along with the associated frame.

In a Serial Attached SCSI protocol implementation, the CSID may include, for example, a 64 bit device name, a 16 bit connection tag, and a 4 bit link rate. The CSID may be common to all frames received in the same connection. That is, each frame received in a particular connection may have the same CSID associated therewith. Thus, it may be wasteful to store the CSID in each of the frames received in the connection.

In some embodiments, a table may be constructed to store CSID information for a particular connection. The table may be referred to as a "connection tag table", and CSID information for the various connections may be referred to as "connection tags."

Referring to FIG. 2, the frame indices stored in the frame index table 120 may be modified to store pointers 126 to the associated connection tags, which are stored in a connection tag table 115. In that case, the frame indices may have a structure such as that shown in Table 2. As shown therein, each entry in the frame index table may include a tag pointer (TAG_PTR), as well as a bit ("last bit") that is set if the frame is the last frame of a particular connection (i.e. the frame is the last stored frame that is associated with the connection tag pointed to by TAG_PTR). By examining the "last" bit, the system may determine to discard a stored connection tag when the last frame of a connection associated with the connection tag has been processed.

TABLE 2

Frame Indices with Connection Tag Pointers

| Sequence No. | Frame Start Address (S bits) | Frame Size (M bits) | Frame Specific Identification Data (P bits) | Last Bit | Tag Pointer (TAG_PTR) |
|---|---|---|---|---|---|
| 0 | | | | | |
| 1 | | | | | |
| . | | | | | |
| . | | | | | |
| . | | | | | |
| q-1 | | | | | |
| q | | | | | |

The connection tag table may have a structure as shown in Table 3.

TABLE 3

Connection Tag Table

| Entry No. | Connection Specific Identification Data (C bits) | Valid Bit |
|---|---|---|
| 0 | | |
| 1 | | |
| . | . | . |
| . | . | . |
| . | . | . |
| t | | |

Each entry in the connection tag table includes C bits of connection specific identification data, along with a valid bit, which, when set, indicates that the corresponding entry is in use by an index in the frame index table 120.

In order to implement a connection tag table as described above, the system controller may implement a register including a bit flag indicating if a frame has been received in the current connection (Frame_received_in_connection_bit). The system may also maintain a current write tag pointer (Current_write_tag_pointer[ ]), which is a pointer to the current tag pointer in the connection tag table 115 associated with writes. The current write tag pointer may be incremented to point to an available entry in the Connection Tag Table 115 when the valid bit for a connection tag is set at the end of a connection.

If the Frame_received_in_connection_bit is set for a connection, then the "last" bit of the frame index of the last frame written to the buffer is set at the end of the connection, provided that the frame index is still valid (i.e. the frame has not been processed before the connection is closed). If a frame index for a frame has the last bit set, the valid bit of the connection tag associated with the frame may be cleared when the frame is processed, indicating that the connection tag entry is free to be used for a new connection. If the connection tag table is full, then new connections may be refused until a tag entry is freed.

By storing connection tags in a connection tag table 115 as provided above instead of storing the CSID information in each frame index, a savings may be realized in terms of the number of memory cells that must be provided in the control system. In particular, the savings may be calculated as follows:

$$\text{Savings} = CT\_SZ*(N_f - N_t) - (N_1*(1 + TAG\_PTR\_SZ)) - N_t$$

where CT_SZ is the connection tag size, N; is the number of indices, $N_t$ is the number of connection tags, and TAG_PTR_SZ is the size of a connection tag pointer. As an example, if the tag pointer size is 2 bits and the connection tag size is 84 bits, then assuming that there are 15 indices and 4 tags, the total savings in storage space is 875 bits.

In conventional systems, the data memory 110 includes one or more fixed sized frame buffers. Each of the fixed sized frame buffers may have a size equal to the maximum frame size. When a frame buffer available notification is sent from a receiving terminal to a source terminal, such as an RRDY primitive, indicating that sufficient buffer space is available for the receiving terminal to receive a frame, the receiving terminal must set aside (reserve) a sufficient amount of space in the data memory 110 to hold a maximum-sized frame. However, an actual received frame may be less than the maximum frame size. In that case, more space in the data memory 110 may be reserved for the frame than is necessary.

Accordingly, some embodiments of the invention may enable a receiving terminal to release unused buffer space if a received frame is smaller than the maximum frame size. Since received frames are typically processed in the order received, the frame buffer may be implemented as a first-in-first-out (FIFO) circular buffer. The buffer space may be efficiently utilized by treating the entire buffer space as a pool and reserving/releasing space within the pool as needed. In that case, the count of buffer credits at a receiving terminal may be updated as follows.

When an RRDY primitive is issued, an amount of the data memory 110 equal to the maximum frame size is reserved (i.e. subtracted from the pool). When a frame is received, an amount of memory equal to the maximum frame size less the actual frame size is released (i.e. added back to the pool). When a buffer is freed as a result of a frame being processed and/or discarded, an amount of memory equal to the actual size of the frame is released.

Operations of the communications terminal 50, 70 associated with the receive buffer may be performed, for example, by a programmable microcontroller operatively attached to the receive buffer and capable of addressing, storing, and manipulating data stored therein. Alternatively or additionally, some operations may be performed by static logic circuits, such as application specific integrated circuits (ASICs) that are configured to perform appropriate logical operations as described herein.

Figure 3:
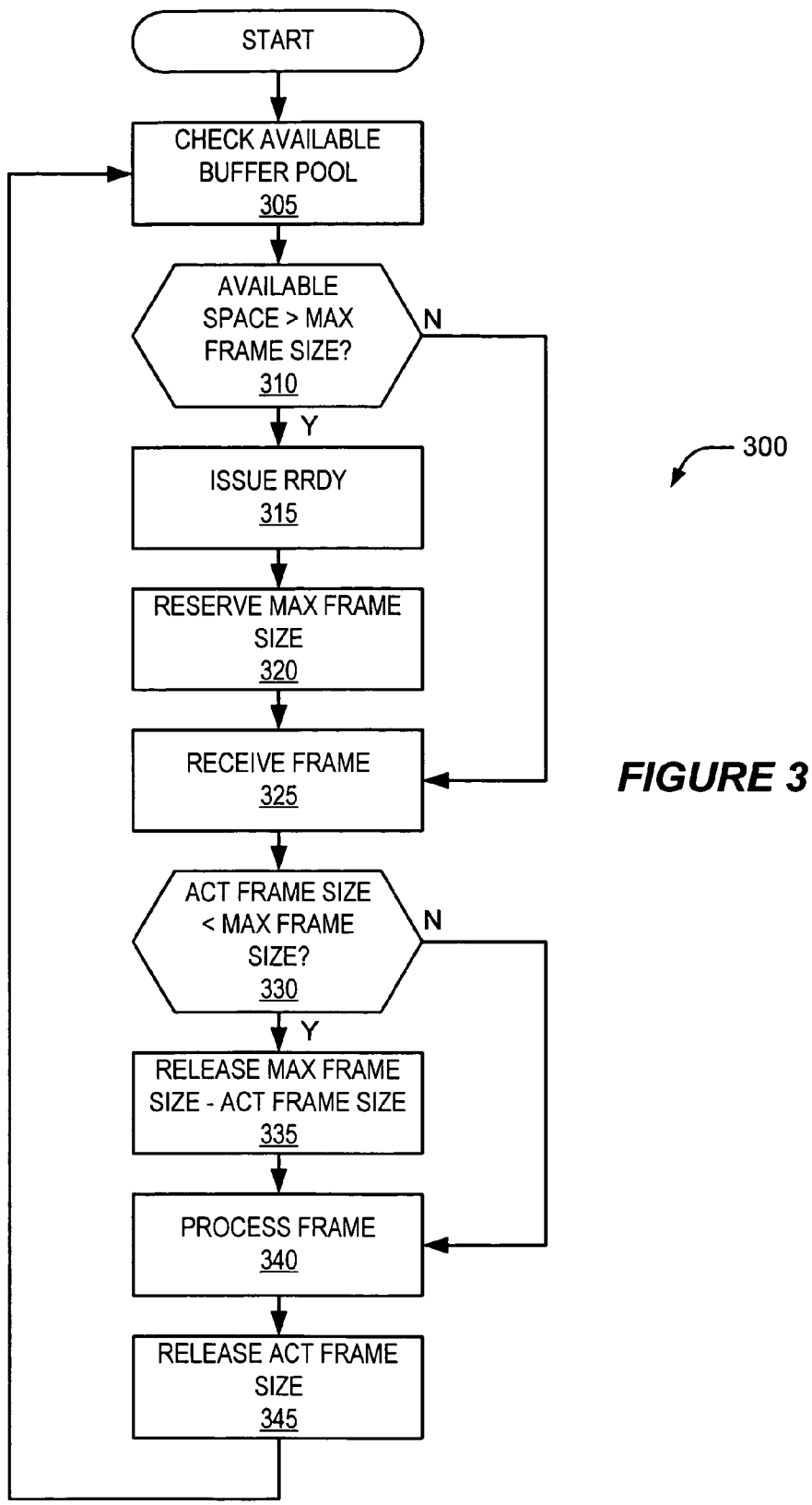
FIG. 3 is a flowchart illustrating operations of a channel adapter for a high speed data communications channel according to embodiments of the invention.

Operations 300 associated with managing a receive buffer in a receiving terminal according to some embodiments of the invention are illustrated in FIG. 3. Operations 300 may be performed by a receiving terminal such as communications terminal 50, 70 and/or a channel adapter 55, 75 included therein and/or attached thereto. The receiving terminal is coupled to a sending terminal by a high speed communications channel such as the communications channel 90.

As shown in FIG. 3, the size of the available buffer pool is checked (block 305), and a determination is made to see if the available buffer pool exceeds the maximum frame size (block 310). If so, a message such as an RRDY primitive is sent to the sending terminal to indicate that the receiving terminal is ready to receive a frame (block 315). When the RRDY indication is sent, a portion of the receive buffer equal to a maximum frame size is reserved (block 320). If in block 310 it is determined that there is not enough free space in the buffer pool to receive an additional frame, control proceeds to block 325, wherein the receiving terminal receives a frame from the sending terminal.

Upon receipt of a frame, the receiving terminal checks to see if the actual size of the received frame is less than the maximum frame size (block 330). If so, then the difference between the maximum frame size and the actual frame size is released back to the pool (block 335), and the frame is processed (block 340). If the actual frame size is equal to the maximum frame size, control passes directly to block 340, and the received frame is processed. Once the received frame has been processed, an amount of memory equal to the actual frame size is released back to the pool of available buffer space (block 345).

Figure 4:
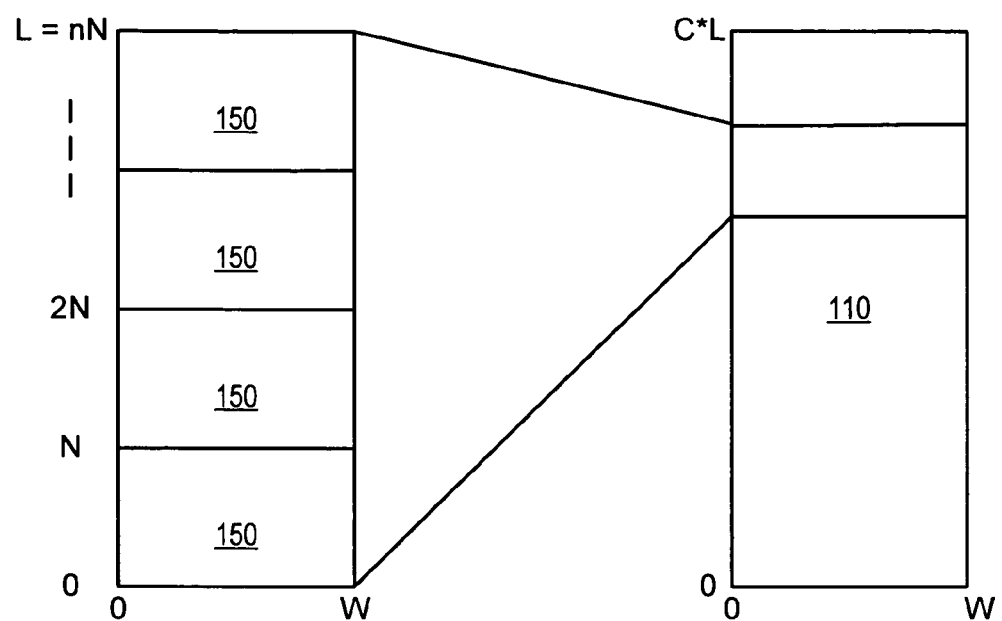
FIG. 4 is a schematic illustration of the logical organization of a receive buffer according to some embodiments of the invention.

In order to reduce the complexity of logic required to implement a circular buffer as described above, it may be desirable to logically organize the data memory 110 into a plurality of fixed-size segments. For example, as illustrated in FIG. 4, in some embodiments of the invention, the data memory 110 may have a width of W bytes. That is, W is the number of bytes of each individually addressable data word in the data memory 110. The number of lines of memory required for a maximum frame size is L. Thus a maximum sized frame includes L*W bytes. The total number of maximum sized frames that the data memory can hold is C. Thus, the data memory 110 includes at least C*L*W bytes, or C*L individually addressable data words.

The data memory may be logically divided into a plurality of segments 150, each including a number N of lines (i.e. N*W bytes), wherein N is chosen such that L/N (i.e. the number of segments 150 in a maximum sized frame) is an integer (i.e. L=nN, where n is an integer). Thus, the maximum number of segments 150 that can be held in the data memory 110 is C*(L/N). Assuming that all received frames are smaller than or equal in size to the segment size, then the capacity of the memory, in frames, is C*(L/N). If N is chosen such that L is an integral multiple of N, then the number of indices required to address the entire data memory 110 is C*(L/N). In actuality, since credit cannot be extended once fewer than L lines of the data memory remain unreserved, the maximum number of frames that may be stored, and the maximum number of indices required, is (C−1)*(L/N)+1.

In some embodiments, N may be chosen to be a power of two, which makes decoding the next frame start address easy, as it can be obtained by simply adding a zero to the current frame start address. However, this may not be possible, since the maximum frame size is determined by the interface standard and need not be a power of two.

In some embodiments, N and L may be chosen such L is larger than the number of rows a maximum sized frame requires, so that L/N is an integer and the maximum small sized frame capacity requirements of the system are met.

Thus, the starting address of each segment in a frame can be encoded using m bits, as follows:

$$m = ceil\left[\log_2\left(\frac{L}{N}\right)\right]$$

where ceil( ) is the ceiling function which rounds non-integer numbers up to the next integer number, e.g. ceil(3.2)=4. Thus, if the base-2 log of L/N is not an integer, the result is rounded up to the next integer value to find m.

Likewise, the total number of bits needed for the read and write pointers to the indices is as follows:

$$I = ceil\left\{\log_2\left[(C-1)*\left(\frac{L}{N}\right)+1\right]\right\}$$

In some embodiments of the invention, the following additional registers may be used in the channel adapter and/or communications terminal:

NEXT_WRITE_ADDRESS_REGISTER, which is an m-bit register than holds the encoded write start address for the next stored frame. This register is updated on completion of writing the current frame to the data memory 110. The value in the register is stored as the start address of the current frame being written. The size of the current frame is checked to see how many segments it occupies. The resulting number is added to the value in the register and the register is updated to hold the sum. The addition may be circular, in that after the last segment is used, the address pointer wraps back to the beginning of the data memory 110 and continues counting from there.

NEXT_WRITE_ADDRESS_REGISTER [f-1:0], which is an f-bit (decoded) write address, which is loaded at the start of writing a new frame with the start address obtained by decoding NEXT_WRITE_ADDRESS_REGISTER. This register is incremented on each subsequent write after the initial write and is circular (i.e. the next address following the last row is 0).

NEXT_READ_ADDRESS_REGISTER [f-1:0], which is an f-bit (decoded) read address. It is loaded at the start of reading a new frame with the start address obtained by decoding the start address of the current index. This register is incremented on each subsequent write after the initial write and is circular (i.e. the next address following the last row is 0).

CURRENT_READ_INDEX [I-1:0], which is a pointer to the next index of the frame to be read.

CURRENT_WRITE_INDEX [I-1:0], which is a pointer to the next index of the frame to be written.

According to some embodiments of the invention, the starting addresses of stored frames are limited to the starting addresses of the segments of the data memory 110. If the frames could start at any address (i.e. at any addressable word) in the data memory 110, then the number of bits required to encode the start address of a frame would be equal to f, where:

$$f=ceil[\log_2(L)]$$

However, according to some embodiments of the invention, a reduced number of bits m may be used to encode the starting address of a frame, where:

$$m = ceil\left[\log_2\left(\frac{L}{N}\right)\right] = ceil(\log_2 L - \log_2 N)$$

Thus, the total savings in flip-flops (latches) required to store the frame start addresses is equal to ceil[$\log_2(L)$]−ceil[$\log_2(L)$−$\log_2(N)$] bits, multiplied by the total number of indices.

An additional savings may be realized in the logic needed to calculate the buffer credit to be granted. In any I/O cycle, there may be as many as four additions or subtractions to the pool of free buffer space. These additions/subtractions may result from the following three possible events:

1) An RRDY (credit to the transmitter) might be issued. Then the pool of free buffers may be reduced by n.

2) A frame might be received, in which case the free buffer pool may be incremented by n−actual number of segments used by the received frame (p). This is because the number committed by the granted credit was n and the transmitter used fewer segments than allocated.

3) A frame gets freed. The number of free buffer segments may be incremented by f, the number of segments used by the frame discarded from the buffer.

Thus, the actual number of free segments in the next cycle=current free segments−n [if credit is issued]+(n−p) [if a frame is completely received that cycle]+p [if a frame is discarded that cycle].

In some embodiments of the invention, the arithmetic required to perform such additions or subtractions may be reduced from f bit additions to m bit additions. Thus, since the adders may be substantially smaller, they may run at higher speeds.

FIGS. 5A and 5B are schematic illustrations of a receive buffer 110 illustrating the reservation and use of buffer space. In the example illustrated in FIG. 5A, a receive buffer 110 contains two frames FRAME_1 and FRAME_2. The frame index table 120 includes encoded pointers FS1 and FS2 to the frame start addresses of FRAME_1 and FRAME_2, respectively. The frame index table also includes the encoded pointer NEXT_READ_ADDRESS (shown as NEXT_READ in FIGS. 5A-6B), which points to the next location within the receive buffer 110 from which a stored frame will be read, and the encoded pointer NEXT_WRITE_ADDRESS (shown as NEXT_WRITE in FIGS. 5A-6B), which points to the next location within the receive buffer 110 to which a received frame will be written. That is, the NEXT_WRITE_ADDRESS pointer points to the beginning of a reserved block within the receive buffer 110. In the example illustrated in FIG. 5A, the reserved space includes sufficient space to store three maximum sized frames (denoted MAX_FRAME_SZ). An optional pointer NEXT_RESERVE points to the next location in memory which may be reserved if a RRDY primitive is sent.

Since the receive buffer 110 is circular, when a pointer reaches the end (top) of the buffer 110, it wraps back to the beginning of the buffer 110. Thus, as illustrated in FIG. 5B, if more frames are reserved, when the NEXT_RESERVE pointer reaches the end of the receive buffer (i.e. it reaches the C*n$^{th}$ segment), it may start back at the beginning (segment 0). Thus, as shown in FIG. 5B, the NEXT_RESERVE pointer points to a memory location below the NEXT_READ_ADDRESS pointer.

As is further illustrated in FIG. 5B, when a frame, such as FRAME_1 has been processed, the NEXT_READ_ADDRESS pointer is updated to point to the next stored frame, which in this example is FRAME_2, and the buffer space formerly occupied by FRAME_1 is released.

As noted above, the address of each frame is encoded such that it may only start at the beginning of a segment. The number of free segments in the buffer may be calculated as follows. If the NEXT_READ_ADDRESS pointer has a value less than the NEXT_RESERVE pointer, then the number of free segments is equal to the total number of segments in the receive buffer (i.e. C*n) less the value of the NEXT_RESERVE pointer, plus the value of the NEXT_READ pointer.

If the NEXT_READ_ADDRESS pointer has a value greater than the NEXT_RESERVE pointer, then the number of free segments is equal to the value of the NEXT_READ pointer less the value of the NEXT_RESERVE pointer. If the values of the NEXT_READ pointer and the NEXT_RESERVE pointer are equal, then the receive buffer is full, assuming that at least one maximum sized frame is reserved at initialization.

While the NEXT_RESERVE pointer is included in the present discussion for purposes of explanation, it will be appreciated that the NEXT_RESERVE pointer is optional, and that the value of the NEXT_RESERVE pointer may be calculated, for example, by keeping track of the number of outstanding RRDY primitives issued by the channel adapter. Other approaches to managing memory space in a circular buffer are known in the art.

FIGS. 6A and 6B are schematic illustrations of a receive buffer further illustrating the reservation and use of buffer space. FIGS. 6A and 6B illustrate a portion of the memory space of the receive buffer 110. In FIG. 6A, a frame FRAME_2 is stored at a memory location starting at memory location FS2. The NEXT_WRITE_ADDRESS pointer points to the memory location immediately following FRAME_2. Furthermore, an amount of memory equal to two maximum sized frames has been reserved for incoming frames. Thus, the NEXT_RESERVE pointer points to a memory location that is two maximum sized frames past the NEXT_WRITE_ADDRESS memory location.

As shown in FIG. 6B, when a new frame is received, it is stored as FRAME_3 in the receive buffer 110 beginning at the memory location designated by the NEXT_WRITE_AD-DRESS pointer. The NEXT_WRITE_ADDRESS pointer is then moved to point to the next memory location after FRAME_3.

The size of the received frame is checked, and if it is less than MAX_FRAME_SZ, the NEXT_RESERVE pointer is decremented by an amount by which MAX_FRAME_SZ exceeds the size of the received frame, which releases unused segments back to the pool of available buffer space. It will be noted that after decrementing the NEXT_RESERVE pointer, the amount of reserved space is still equal to a full MAX_FRAME_SZ. The channel adapter may then check the amount of available buffer space and issue a new RRDY primitive if the amount of free buffer space exceeds the MAX_FRAME_SZ.

If the smallest frames are smaller than the segment size, then it is possible that the data memory may not be fully utilized. However, that may not be a concern, since the number of indices (corresponding to the number of buffer credits) may be the limiting factor in such a case. The added performance benefits of reducing the segment size may depend on the particular system implementation.

Furthermore, additional logic may be used in some embodiments of the invention in order to decode the actual start addresses from the encoded start addresses. However, this logic may be implemented as static logic, and no more than two copies of such logic would be used (one for the read address and one for the write address). Additional logic may also be used to computer the number of segments that a given frame occupies, given the size of the frame in bytes.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of managing a receive buffer in a receiving communications terminal, wherein the receive buffer comprises a data memory organized into a plurality of individually addressable data words and into a plurality of segments, each of the segments is larger than one addressable data word but smaller than a maximum frame size, the method comprising:

receiving a frame of data from an originating communications terminal;

storing the received frame of data in the receive buffer beginning at a selected segment of a group of reserved segments;

releasing a number of the reserved segments equal to the number of segments in a maximum frame size less an actual number of segments occupied by the received frame;

in response to a determination that a number of unreserved segments available in the receive buffer after storing the received frame is larger than the maximum frame size, sending a frame buffer available notification to the originating communications terminal and reserving a number of segments in the receive buffer equal to the maximum frame size; and encoding a starting address of the selected segment as an encoded frame start address.

2. The method of claim 1, further comprising:

determining a number of unreserved segments that are available for storing received frames after releasing the number of reserved segments.

3. The method of claim 1, wherein the received frame is received over a Serial Attached SCSI connection and/or a Fibre Channel Arbitrated Loop connection, and wherein the frame buffer available notification comprises an RRDY primitive.

4. The method of claim 1, wherein the address of the selected segment of the group of reserved segments is stored in a read address pointer, the method further comprising updating the read address pointer after storing the received frame to the address of a next available segment after the stored received frame.

5. The method of claim 4, wherein updating the read address pointer comprises resetting the read address pointer to zero after the read address pointer has reached a maximum read address in the data memory.

6. The method of claim 1, further comprising:

storing the encoded frame start address in a frame index table.

7. The method of claim 1, further comprising:

storing a frame length and a frame index along with the frame start address in a frame index table.

8. The method of claim 7, further comprising:

storing frame specific identification data along with the frame start address in the frame index table.

9. The method of claim 7, further comprising:

storing connection specific identification data along with the frame start address in the frame index table.

10. The method of claim 1, wherein encoding the address of the selected segment comprises encoding an m-bit address according to the formula:

$$m = ceil\left[\log_2\left(\frac{L}{N}\right)\right]$$

wherein L equals the number of addressable words in a maximum sized frame, and N equals the number of addressable words in a segment.

11. The method of claim 1, further comprising encoding a read index pointer to a next read location within the frame index, and a write index pointer to a next location to which a frame index may be written.

12. The method of claim 11, further comprising:
updating the write index pointer after storing the frame index pointer in a frame index table.

13. The method of claim 11, further comprising:
processing the received frame; and
releasing the segments occupied by the received frame; and
updating the read index pointer after processing the received frame.

14. The method of claim 6, wherein a number of entries in the index table is calculated according to the formula $(C-1)(L/N)+1$, where C equals the number of addressable words in the data memory divided by the number of addressable words in a maximum sized frame, L equals the number of addressable words in a maximum sized frame, and N equals the number of addressable words in a segment.

15. The method of claim 1, further comprising:
processing the received frame; and
releasing the segments occupied by the received frame.

16. The method of claim 1, wherein a number of addressable data words in a maximum sized frame is an integral multiple of a number of addressable data words in a segment.

17. A communications terminal, comprising:
a channel adapter configured to receive a frame of data from an originating communications terminal over a communications channel, wherein the channel adapter comprises a receive buffer comprising a data memory organized into a plurality of individually addressable data words and into a plurality of segments, each of which is larger than one addressable data word but smaller than a maximum frame size;
a logic circuit configured to store the received frame of data in the receive buffer beginning at a selected segment of a group of reserved segments; configured to release a number of the reserved segments equal to the number of segments in a maximum frame size less an actual number of segments occupied by the received frame; and configured, in response to a determination that a number of segments available after storing the received frame is larger than the maximum frame size, to send a frame buffer available notification to the originating communications terminal, to reserve a number of segments in the data memory equal to the maximum frame size, and to encode a starting address of the selected segment as an encoded frame start address.

18. The communications terminal of claim 17, wherein the logic circuit is further configured to to store the encoded frame start address in a frame index table.

* * * * *